(12) United States Patent
Gauronski et al.

(10) Patent No.: US 8,467,092 B2
(45) Date of Patent: Jun. 18, 2013

(54) METHOD AND SYSTEM FOR CREATING AND USING CUSTOMIZED SAMPLE RENDERING JOB

(75) Inventors: Jefferey John Gauronski, Penfield, NY (US); Joseph M. Harrison, Ontario, NY (US); Jack A. Hirsh, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 809 days.

(21) Appl. No.: 12/691,078

(22) Filed: Jan. 21, 2010

(65) Prior Publication Data

US 2011/0176151 A1 Jul. 21, 2011

(51) Int. Cl.
*G06K 15/02* (2006.01)
*H04N 1/40* (2006.01)
*H04N 1/60* (2006.01)

(52) U.S. Cl.
USPC ............ 358/1.9; 358/1.18; 358/504; 358/406

(58) Field of Classification Search
USPC ................ 358/1.9, 2.1, 3.24, 3.26, 1.18, 504, 358/518, 406, 462
See application file for complete search history.

(56) References Cited

U.S. PATENT DOCUMENTS

| | | | |
|---|---|---|---|
| 5,872,640 A * | 2/1999 | Cohen et al. | 358/442 |
| 6,064,492 A | 5/2000 | Eldridge et al. | 358/1.15 |
| 6,175,700 B1 | 1/2001 | Miller et al. | 399/72 |
| 6,771,384 B1 * | 8/2004 | Laverty et al. | 358/1.9 |
| 6,952,283 B2 | 10/2005 | Thieret | 358/1.2 |
| 7,268,910 B2 * | 9/2007 | Catt et al. | 358/1.18 |
| 2007/0008557 A1 | 1/2007 | Harrington et al. | 358/1.9 |
| 2008/0043271 A1 | 2/2008 | Gil et al. | 358/1.9 |
| 2008/0144054 A1 | 6/2008 | Van de Capelle et al. | 358/1.9 |

* cited by examiner

*Primary Examiner* — Scott A Rogers
(74) *Attorney, Agent, or Firm* — Kermit D. Lopez; Luis M. Ortiz; Ortiz & Lopez, PLLC

(57) ABSTRACT

A system and method for configuring a customized sample job for monitoring print quality and increasing proofing flexibility. A sample job comprising one or more pages can be created in association with print programming attributes utilizing a document creation application. The sample job can be raster image processed with respect to a user specified job setting and stored in an electronic memory component (e.g., DFE component, computer memory, Flash memory, USB memory, etc) as a custom sample job. The custom sample job can then be selected with respect to a primary rendering job in order to render a sample page based on a predefined frequency interval (e.g., after every N sheets) to a sample tray. The frequency interval associated with the custom sample job production can be predefined on a job-by-job and/or global basis by a user.

20 Claims, 3 Drawing Sheets

METHOD AND SYSTEM FOR CREATING AND USING CUSTOMIZED SAMPLE RENDERING JOB

TECHNICAL FIELD

Embodiments are generally related to multi-function devices such as printers, scanners, photocopy machines, and the like. Embodiments are also related to proofing systems and techniques. Embodiments are additionally related to methods for creating and rendering customized sample job for monitoring rendering quality.

BACKGROUND OF THE INVENTION

A MFD (Multi-Function Device) is a rendering device or office machine, which incorporates the functionality of multiple devices in a single apparatus or system, so as to allow a smaller footprint in a home or small business setting, or to provide centralized document management/distribution/production in the context of, for example, a large-office setting. A typical MFD may provide a combination of some or all of the following capabilities: printer, scanner, photocopier, fax machine, e-mail capability, and so forth. Networked MFDs (Multi-Function Devices) generally interact with an assemblage of varying rendering devices, client computers, servers, and other components that are connected to and communicate over a computer network, which may be a wired and/or a wireless network.

In digital production rendering, multipage documents can be rendered (e.g., printed) and delivered via closed paper paths to a finishing device that does not permit convenient access to the rendered output until the rendering process is complete. During long print runs, however, it is often desirable to determine the quality of printing, ink color, paper substrate performance, color sweep test patches and other such aspects associated with the contemplated printing run. Hence, a sample page may be generated to permit a press operator to ensure that an appropriate content is being rendered and that the appearance of an output matches customer expectations.

The majority of prior art approaches to generating of such sample pages permit a user to select single duplicate sample pages associated with a current rendering job on a Digital Front End (DFE) component. Unfortunately, such prior art techniques can either lead to a printing sheet that does not adequately indicate the rendering performance with respect to images and/or text and which is unable to simulate other significant conditions prevailing during the actual printing run. Additionally, such methods are too cumbersome to program and the user needs to uniquely "know" the pages to sample for each job.

Based on the foregoing, it is believed that a need exists for an improved system and method capable of creating and rendering a customized sample job at a predefined frequency interval, as described in greater detail herein.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved method and system for configuring a multi-function device (MFD), such as a printer, scanner, photocopy machine, fax machine, etc., or a combination thereof.

It is another aspect of the disclosed embodiments to provide for an improved system and method for creating and rendering a customized sample job that includes programming attributes with respect to a primary rendering job.

It is a further aspect of the disclosed embodiments to provide for an improved method and system for determining a frequency interval for rendering the customized sample job.

The aforementioned aspects and other objectives and advantages can now be achieved as described herein. A system and method for configuring a customized sample job for monitoring print quality and increasing proofing flexibility is disclosed. A sample job comprising one or more pages can be created in association with print programming attributes (e.g., stress images, text and graphics, color sweep test patches, etc) utilizing a document creation application (e.g., Quark Express, Photoshop, or Microsoft Word). The sample job can be raster image processed with respect to a user specified job settings and stored in an electronic storage component (e.g., computer memory, DFE component, Flash memory storage, USB keychain, etc) component as a custom sample job. The custom sample job can then be selected with respect to a primary rendering job in order to render a sample page based on a predefined frequency interval (e.g., after every N sheets) to a sample tray. The frequency interval associated with the custom sample job production can be predefined on a job-by-job or global basis by a user. Such periodic production of the custom sample job during a production run permits the user to monitor print performance.

The custom sample job can be programmed with similar or dissimilar job settings with respect to the primary rendering job based on the user preference. The programming attributes with respect to the rendering job may include, for example, image areas such as skin tones, skies, or memory colors, text and graphics, colors that may need to be controlled to tight tolerances such as PANTONE® colors or other spot colors, and test patches that can be measured. The sample page(s) can be employed with every print run and can include the programming attributes based on the user preference.

Each time an appropriate number of document sets associated with the rendering job has been rendered for the main production run, the DFE submits the custom sample job based on the user defined frequency. The operator removes the custom sample job from the sample tray as they are rendered in order to check the quality. Such an approach provides a better ability and greater flexibility to monitor the output of a MFD during long production runs. By identifying problems before the completion of a production run, the operator is able to avoid wasted time and materials.

BRIEF DESCRIPTION OF THE DRAWINGS

The accompanying figures, in which like reference numerals refer to identical or functionally-similar elements throughout the separate views and which are incorporated in and form a part of the specification, further illustrate the disclosed embodiments and, together with the detailed description of the invention, serve to explain the principles of the disclosed embodiments.

DETAILED DESCRIPTION

The particular values and configurations discussed in these non-limiting examples can be varied and are cited merely to illustrate at least one embodiment and are not intended to limit the scope thereof.

Figure 1:
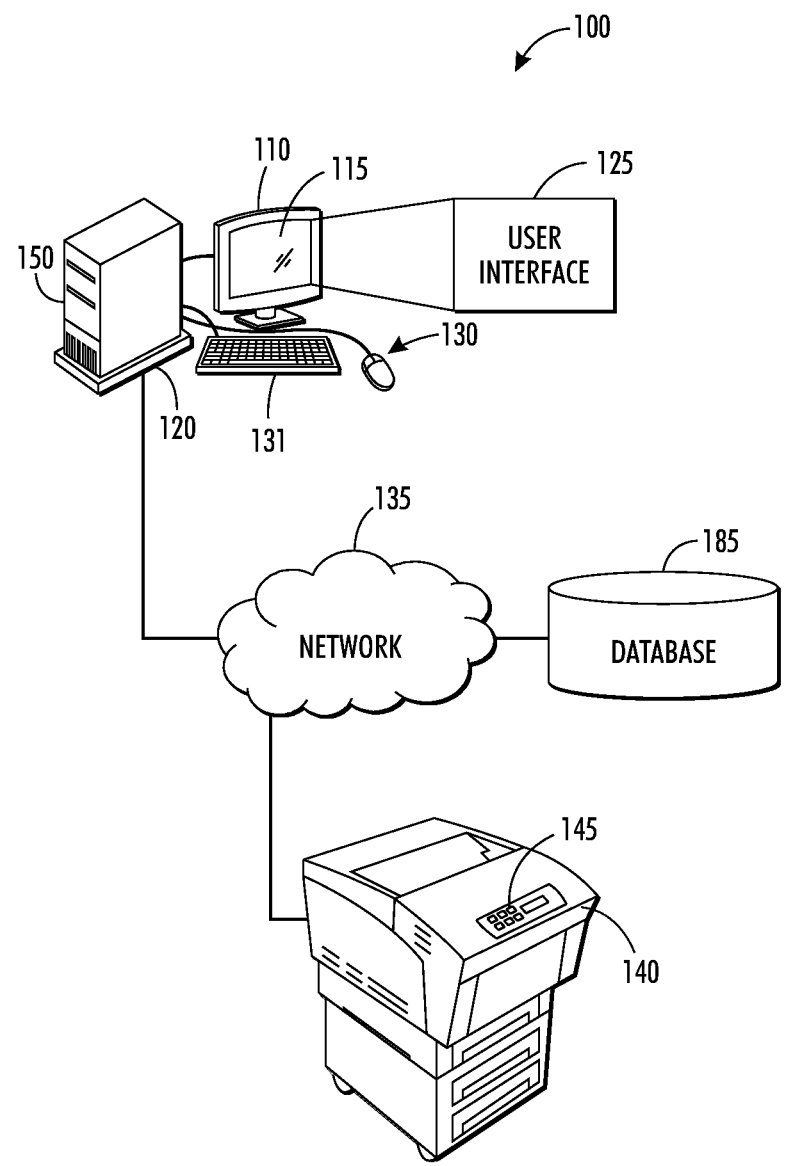
FIG. 1 illustrates an example of a MFD coupled to a data-processing system through a network, in accordance with the disclosed embodiments.

FIG. 1 is provided as an exemplary diagram of data processing environments in which embodiments of the present invention can be implemented. It should be appreciated that FIG. 1 is only exemplary and is not intended to assert or imply any limitation with regard to the environments in which aspects or embodiments of the present invention can be implemented. Many modifications to the depicted environments can be made without departing from the spirit and scope of the disclosed embodiments.

Referring to FIG. 1, system 100 includes a multi-function device 140 coupled to a data-processing system 110 through a network 135. The data-processing system 110 can be, for example, a computing device such as, for example, personal computer, a server, a computer workstation, a laptop computer or another computing apparatus or system (e.g., wireless cellular telephone, Smartphone, etc), and generally includes a central processor 120, a display device 115, a keyboard 131, and a pointing device 130 (e.g., mouse, track ball, pen device, or the like). Additional input/output devices, such as the multi-function device 140, may be included in association with the data-processing system 110 as desired.

Note that as utilized herein, the term multi-function device (including the acronym MFD) may refer to an apparatus or system such as a printer, scanner, fax machine, copy machine, etc., and/or a combination thereof. Preferably, MFD 140 is capable of multiple rendering functions such as printing, copying, scanning, faxing, etc. In some embodiments, MFD 140 can be implemented with a single rendering function such as printing. In other embodiments, MFD 140 can be configured to provide multiple rendering functions, such as scanning, faxing, printing and copying.

A non-limiting example of a MFD that can be utilized as MFD 140 is disclosed in U.S. Pat. No. 7,525,676, entitled "System and Method for Controlling Access to Programming Options of a Multifunction Device," which issued on Apr. 28, 2009 to Robert J. Pesar. U.S. Pat. No. 7,525,676, which is incorporated herein by reference in its entirety, is assigned to the Xerox Corporation of Norwalk, Conn. Another non-limiting example of a MFD that can be utilized as MFD 140 is disclosed in U.S. Pat. No. 7,474,428, entitled "Multifunction Device System Using Tags Containing Output Information," which issued on Jan. 6, 2009 to Morris-Jones, et al. U.S. Pat. No. 7,474,428, which is incorporated herein by reference in its entirety, is also assigned to the Xerox Corporation of Norwalk, Conn. An additional example of a MFD that can be utilized as MFD 140 is disclosed in U.S. Pat. No. 5,920,405, entitled "Multifunction Device With Printer/Facsimile Contention Selection," which issued on Jul. 6, 1999 to McIntyre, et al. U.S. Pat. No. 5,920,405, which is incorporated herein by reference in its entirety, is also assigned to the Xerox Corporation of Norwalk, Conn. Note that such MFDs are referenced herein for generally illustrative purposes and are not considered limiting features of the disclosed embodiments.

The data-processing system 110 can communicate with the MFD 140 through, for example, a computer network 135 or other networking configuration. Network 135 may employ any network topology, transmission medium, or network protocol, such as, for example, Ethernet, Internet, Intranet, etc. Network 135 may include connections, such as wired links, wireless communication links, fiber optic cables, USB components, and so forth. The MFD 140 includes a user interface 145, such as a panel menu. The panel menu can be employed to select features and enter other data in the MFD 140. Such interfaces may include, for example, touch screens having touch activated keys for navigating through an option menu or the like.

A MFD driver program can be installed at the data-processing system 110 and can reside on a hard drive 150 of host device. The MFD driver program can be activated through an application interface so that a user may generate a rendering job with the MFD driver for processing by the MFD 140. The data-processing system 110 also includes a GUI 125 for communicating MFD features for processing, for example, the rendering job to a user and accepting the user's selection of available MFD features. The user interface 125 displays information and receives data through device display and/or the keyboard/mouse combination. The interface 125, also serves to display results, whereupon the user may supply additional inputs or terminate a given session. The data-processing system 110 can be, for example, any computing device capable of being integrated within a network, such as a PDA, personal computer, cellular telephone, point-of-sale terminal, server, etc.

Note that the user interface as utilized herein generally refers to a type of environment that represents programs, files, options and so forth by means of graphically displayed icons, menus, and dialog boxes on a screen. The input device of the multi-function device 140 can include a local user interface, such as a touch-screen display or separate keypad and display or a memory fob or the like as discussed above. Alternatively or additionally, the input device can be a wireless port that receives a wireless signal containing constraint data from a portable device. The wireless signal can be an infrared or electromagnetic signal. A system administrator may input constraint data through the local user interface by manipulating the touch screen, keypad, or communicating via wireless messages through the wireless port. The administrator's portable device that communicates wirelessly can be a personal digital assistant (PDA), or the like, as noted above.

The following description is presented with respect to embodiments of the present invention, which can be embodied in the context of a data-processing system 110 and MFD 140 depicted in FIG. 1. The present invention, however, is not limited to any particular application or any particular environment. Instead, those skilled in the art will find that the system and methods of the present invention can be advantageously applied to a variety of system and application software, including database management systems, word processors, and the like. Moreover, the present invention can be embodied on a variety of different platforms, including Macintosh, UNIX, LINUX, and the like. Therefore, the description of the exemplary embodiments, which follows, is for purposes of illustration and not considered a limitation.

Figure 2:
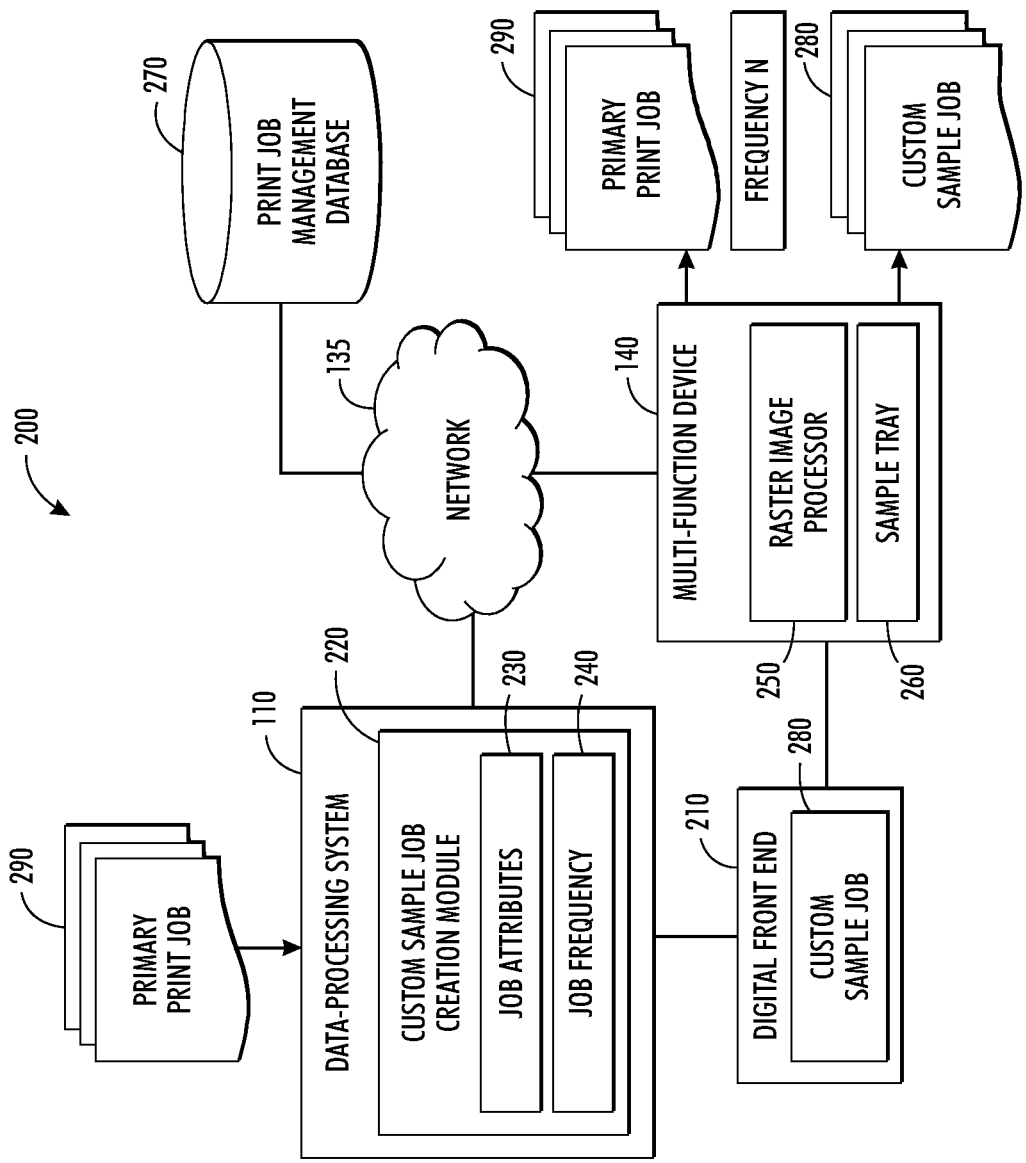
FIG. 2 illustrates a block diagram of a rendering job management system, in accordance with the disclosed embodiments.

FIG. 2 illustrates a block diagram of a print job management system 200 associated with a customized sample job creation module 220, in accordance with the disclosed embodiments. Note that in FIGS. 1-3, identical or similar blocks are generally indicated by identical reference numerals. The print job management system 200 can be employed for monitoring print quality during long print runs. The print job management system 200 generally includes the network 135 associated with the multi-function device 140, data-processing system 110 and a database 270. Database 270 is analogous to the database 185 depicted in FIG. 1.

The MFD can be, for example, an office machine, which incorporates the functionality of multiple devices in one, so as to provide centralized document management, document distribution and production in a large-office setting and the like. The typical MFD may act as a combination of a printer, scanner, photocopier, fax and e-mail. While single multi-function device 140 is shown by way of example, it is to be appreciated that any number of multi-function devices can be linked to the network, such as two, four, six or more rendering devices. In general, the multi-function devices 140 and 144 can be employed to perform a rendering output function (e.g., printing, scanning, copying, faxing, etc) within a networked environment.

A Digital Front End (DFE) component 210 associated with the data-processing system 110 and the multi-function device 140 can be programmed to generate a custom sample job 280 containing one or more print programming attributes 230 that need to be monitored and controlled. The custom sample job 280 can include one or more pages and can be created utilizing a document creation application (e.g., Quark Express, Photoshop, or Microsoft Word). The DFE component 210 is preferably a digital front end controller such as a personal computer or a custom made processor that is programmed to operate as described herein. The custom sample job 280 can be created utilizing the custom sample job creation module 220. The custom sample job 280 can be rendered in association with a primary job 290 with a predefined frequency interval 240, to a location separate from where the main job documents are rendered. The operator can retrieve and examine the custom sample job 280 during job production and can immediately take corrective action if required.

Note that the term digital front end or DFE as discussed herein generally refers to the central management component of the digital printing system of MFD 140. The DFE component 210 is capable of loading files from various network sources associated with network 135 and process the files so they can be output on various digital equipment, whether it be a small desktop printer or a large digital press. The DFE component 210, in most cases, is a powerful unit that accepts and processes files for variable data applications and also pulls information from the database 270 for more personalized documents. The DFE component 210 provides consistency in color, quality, and accuracy, assuring print providers and customers that projects will be of the highest standards at all times.

The DFE 210 can access the custom sample job creation application module 220 to enter print programming attributes 230 related to the custom sample job 280. Such a module is typically implemented in the context of a software application, and/or modules (e.g., hardware and/or software) that enable image processing and control functions such as those described herein with respect to FIGS. 2-3. It can be appreciated that the module 200 can also be accessed through a pre-press system.

Note that as utilized herein, the term "module" may refer to a physical hardware component and/or to a software module. In the computer programming arts, such a software "module" can be implemented as a collection of routines and data structures that performs particular tasks or implements a particular abstract data type. Modules of this type are generally composed of two parts. First, a software module may list the constants, data types, variable, routines, and so forth that can be accessed by other modules or routines. Second, a software module can be configured as an implementation, which can be private (i.e., accessible only to the module), and which contains the source code that actually implements the routines or subroutines upon which the module is based.

Therefore, when referring to a "module" herein, the inventors are generally referring to such software modules or implementations thereof. The methodology described herein can be implemented as a series of such modules or as a single software module. Such modules can be utilized separately or together to form a program product that can be implemented through signal-bearing media, including transmission media and recordable media. The present invention is capable of being distributed as a program product in a variety of forms, which apply equally regardless of the particular type of signal-bearing media utilized to carry out the distribution.

The job attributes 230 can include, for example, image areas such as skin tones, skies, or other memory colors; text and graphics; colors that may need to be controlled to tight tolerances such as PANTONE® colors or other spot colors; and even test patches that can be measured. The MFD 140 further includes a processor 250 (e.g., RIP component/processor) for generating bitmap of an image to be rendered. Note that the acronym "RIP" generally refers to "Raster Image Processor" or "Raster Image Processing". The processor 250 generates bitmap images from a PDL stream. Recall previously that the acronym PDL refers to "Page Description Language," which is a language that generally describes the appearance of a rendered page. The sample job can be raster image processed by the processor 250 (e.g., RIP processor) with respect to the user specified job settings 230 and stored in the DFE 210 as the custom sample job 280. The user can be provided with an option to render the sample job 280 at the predefined frequency interval 240 (e.g., after every N sheet or after every N sets or after every N jobs).

The custom sample job 280 can be rendered and delivered to a sample tray 260 associated with the MFD 140. The operator removes the diagnostic custom sample job 280 from the sample tray 260 as they are rendered and checks the quality visually or with a measurement device. If the quality is not acceptable, adjustments may be made to press controls or the MFD 140 may be paused for service. The job frequency interval 240 for rendering the custom sample job 280 can be specified on a job-by-job or global basis by the operator.

Note that the disclosed embodiments may be embodied in the context of a data-processing system and/or rendering device, such as, for example, the data-processing system 110 and rendering device 140 depicted in FIG. 1. It can be appreciated, however, that the disclosed embodiments are not limited to any particular application or any particular environment. Instead, those skilled in the art will find that the disclosed embodiments may be advantageously applied to a variety of systems and software applications. Moreover, the disclosed embodiments may be embodied in a variety of different platforms, including but not limited to, for example, Macintosh, UNIX, LINUX, and the like. Therefore, the description of the exemplary embodiments, which follows, is for purposes of illustration and is not considered a limitation.

Figure 3:
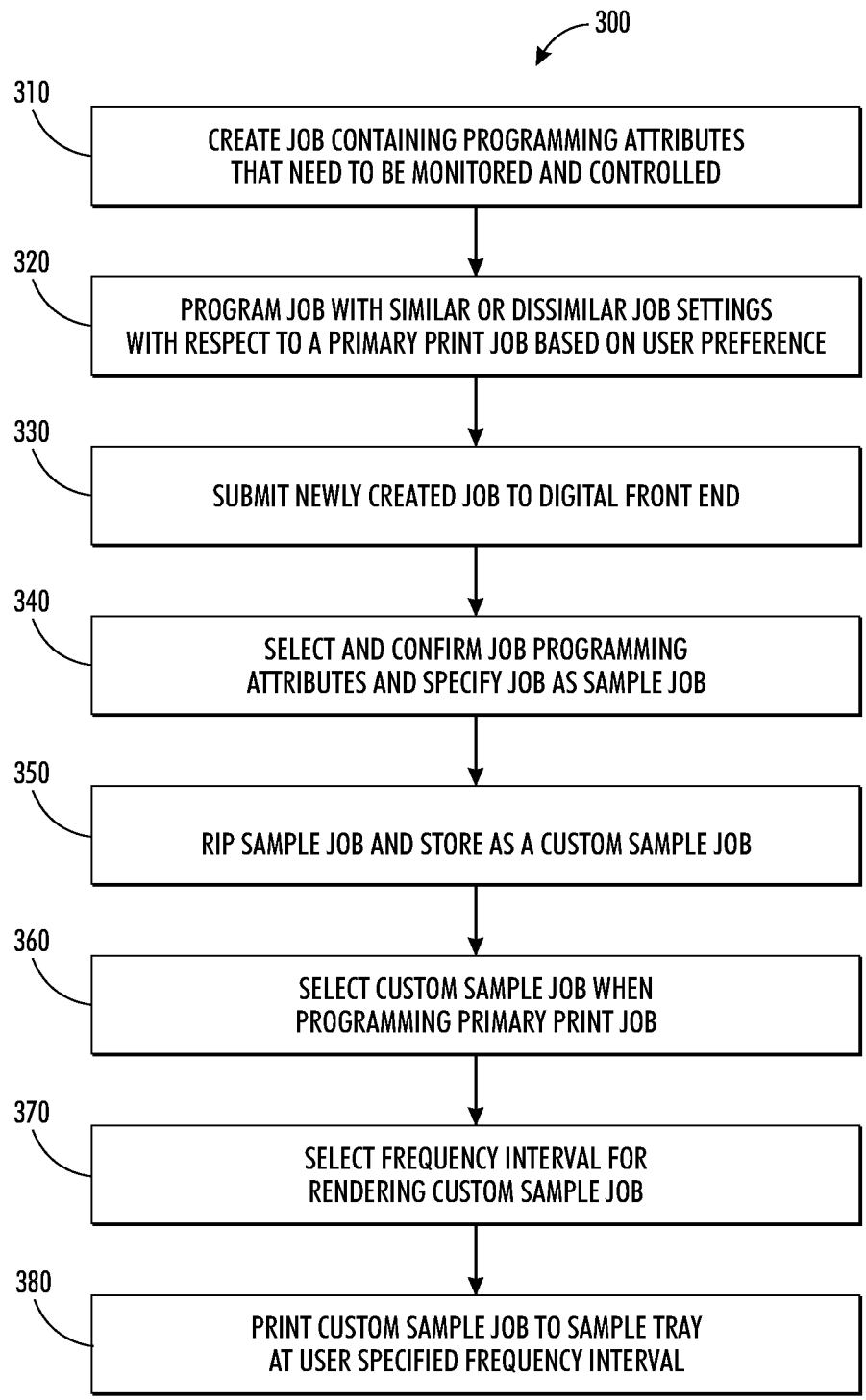
FIG. 3 illustrates a high level flow chart of operation illustrating logical operational steps of a method for creating and rendering a customized sample job at a predefined frequency interval, in accordance with the disclosed embodiments.

FIG. 3 illustrates a high level flow chart of operation illustrating logical operational steps of a method 300 for creating and rendering the custom sample job 280 at the predefined frequency interval 240, in accordance with the disclosed embodiments. A job containing programming attributes 230 that need to be monitored and controlled can be created, as illustrated at block 310. The job can be programmed with similar or dissimilar job settings with respect to a primary print job 290 based on user preference, as indicated at block 320. The newly created job can be submitted to the digital front end 210, as depicted at block 330. The job programming attributes 230 can be selected and confirmed and the job can be specified as a sample job, as illustrated at block 340.

The sample job can be raster image processed and stored as a custom sample job 280, as indicated at block 350. The custom sample job 280 can then be selected when programming primary print job 290, as depicted at block 360. Thereafter, as indicated at block 370, the frequency interval 240 for rendering the custom sample job 280 can be selected. The custom sample job 280 can be rendered to the sample tray 260 at the user specified frequency interval 240, as illustrated at block 380. Such an approach provides a better ability and greater flexibility for user to monitor the output of the MFD 140 during long production runs. By identifying problems before the completion of a production run, the operator is able to avoid wasted time and materials.

While the present invention has been particularly shown and described with reference to a preferred embodiment, it will be understood by those skilled in the art that various changes in form and detail can be made therein without departing from the spirit and scope of the invention. Furthermore, as used in the specification and the appended claims, the term "computer" or "system" or "computer system" or "computing device" includes any data processing system or apparatus including, but not limited to, personal computers, servers, workstations, network computers, main frame computers, routers, switches, Personal Digital Assistants (PDA's), telephones, and any other system capable of processing, transmitting, receiving, capturing and/or storing data. Thus, the data-processing system 110 depicted in FIG. 1, for example, may equally be implemented as PDA, cellular telephone, Smartphone, laptop computer, iPhone, Blackberry type device as well as other types of personal or desktop computers.

Based on the foregoing, it can be appreciated that one embodiment is directed toward a method for creating a customized sample job. Such a method generally includes creating a job having at least one page in association with a plurality of programming attributes to be monitored and controlled via a document creation application, by executing a program instruction in a data-processing system; performing raster image processing with respect to the job associated with the plurality of programming attributes in order to thereafter store the job in an electronic storage component as a custom sample job, by executing a program instruction in a data-processing system; and selecting the custom sample job with respect to a primary rendering job in order to render the custom sample job based on a predefined frequency interval to a sample tray, by executing a program instruction in a data-processing system and thereby monitor print quality and increasing proofing flexibility during a production run.

In another embodiment of such a method, an operation can be implemented and processed for pre-defining the frequency interval associated with the custom sample job, by executing a program instruction in a data-processing system. In yet another embodiment, of such a method, a step can be implemented for programming the custom sample job with similar job settings with respect to the primary rendering job based on a user preference, by executing a program instruction in a data-processing system. In still another embodiment of such a method, a step can be implemented for programming the custom sample job with dissimilar job settings with respect to the primary rendering job based on a user preference, by executing a program instruction in a data-processing system.

In other embodiments of such a method, an operation or step can be implemented for submitting the custom sample job based on the predefined frequency each time an appropriate number of document set associated with the primary rendering job is rendered for a main production run, by executing a program instruction in a data-processing system. In other embodiments, the programming attributes can be configured to comprise at least one of the following types of attributes: stress images; color sweep test patches; image areas; text and graphics; and spot colors.

It can be further appreciated based on the foregoing that another embodiment is directed toward a system for creating a customized sample job. Such a system generally includes a processor, a data bus coupled to the processor, and a computer-usable medium embodying computer code, the computer-usable medium being coupled to the data bus. The computer program code can include instructions executable by the processor and configured for creating a job having at least one page in association with a plurality of programming attributes to be monitored and controlled via a document creation application, performing raster image processing with respect to the job associated with the plurality of programming attributes in order to thereafter store the job in an electronic storage component as a custom sample job, and selecting the custom sample job with respect to a primary rendering job in order to render the custom sample job based on a predefined frequency interval to a sample tray and thereby monitor print quality and increasing proofing flexibility during a production run.

In another embodiment of such a system, the aforementioned instructions can be configured for pre-defining the frequency interval associated with the custom sample job. In an alternative embodiment of such a system, such instructions can be configured for programming the custom sample job with similar job settings with respect to the primary rendering job based on a user preference. In yet another embodiment of such a system, such instructions can be configured for programming the custom sample job with dissimilar job settings with respect to the primary rendering job based on a user preference. In still another embodiment of such a system, the instructions can be configured for submitting the custom sample job based on the predefined frequency each time an appropriate number of document set associated with the primary rendering job is rendered for a main production run. Additionally, such instructions can be configured to designate the programming attributes to include at least one of the following types of attributes: stress images; color sweep test patches; image areas; text and graphics; and spot colors.

It will be appreciated that variations of the above disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for creating a customized sample job, said method comprising:

creating a job having at least one page in association with a plurality of programming attributes to be monitored and controlled via a document creation application, by executing a program instruction in a data-processing system;

performing raster image processing with respect to said job associated with said plurality of programming attributes in order to thereafter store said job in an electronic storage component as a custom sample job, by executing a program instruction in a data-processing system; and selecting said custom sample job with respect to a primary rendering job in order to render said custom sample job based on a predefined frequency interval to a sample tray, by executing a program instruction in a data-processing system and thereby monitor print quality and increasing proofing flexibility during a production run.

2. The method of claim 1 further comprising pre-defining said frequency interval associated with said custom sample job, by executing a program instruction in a data-processing system.

3. The method of claim 1 further comprising programming said custom sample job with similar job settings with respect to said primary rendering job based on a user preference, by executing a program instruction in a data-processing system.

4. The method of claim 1 further comprising programming said custom sample job with dissimilar job settings with respect to said primary rendering job based on a user preference, by executing a program instruction in a data-processing system.

5. The method of claim 1 further comprising submitting said custom sample job based on said predefined frequency each time an appropriate number of document set associated with said primary rendering job is rendered for a main production run, by executing a program instruction in a data-processing system.

6. The method of claim 1 further comprising configuring said plurality of programming attributes, by executing a program instruction in a data-processing system, to comprise at least one of the following types of attributes:
   stress images;
   color sweep test patches;
   image areas;
   text and graphics; and
   spot colors.

7. A system for creating a customized sample job, said system comprising:
   a processor;
   a data bus coupled to said processor;
   a computer-usable medium embodying computer code, said computer-usable medium being coupled to said data bus, said computer program code comprising instructions executable by said processor and configured for:
      creating a job having at least one page in association with a plurality of programming attributes to be monitored and controlled via a document creation application;
      performing raster image processing with respect to said job associated with said plurality of programming attributes in order to thereafter store said job in an electronic storage component as a custom sample job; and
      selecting said custom sample job with respect to a primary rendering job in order to render said custom sample job based on a predefined frequency interval to a sample tray and thereby monitor print quality and increasing proofing flexibility during a production run.

8. The system of claim 7 wherein said instructions are further configured for pre-defining said frequency interval associated with said custom sample job.

9. The system of claim 7 wherein said instructions are further configured for programming said custom sample job with similar job settings with respect to said primary rendering job based on a user preference.

10. The system of claim 7 wherein said instructions are further configured for programming said custom sample job with dissimilar job settings with respect to said primary rendering job based on a user preference.

11. The system of claim 7 wherein said instructions are further configured for submitting said custom sample job based on said predefined frequency each time an appropriate number of document set associated with said primary rendering job is rendered for a main production run.

12. The system of claim 7 wherein said instructions are further configured for designating said plurality of programming attributes to comprise at least one of the following types of attributes:
   stress images;
   color sweep test patches;
   image areas;
   text and graphics; and
   spot colors.

13. The system of claim 7 wherein said instructions are further configured for:
   pre-defining said frequency interval associated with said custom sample job; and
   programming said custom sample job with similar job settings with respect to said primary rendering job based on a user preference.

14. The system of claim 7 wherein said instructions are further configured for:
   pre-defining said frequency interval associated with said custom sample job; and
   programming said custom sample job with dissimilar job settings with respect to said primary rendering job based on a user preference.

15. A system for creating a customized sample job, said system comprising:
   a processor;
   a data bus coupled to said processor;
   a computer-usable medium embodying computer code, said computer-usable medium being coupled to said data bus, said computer program code comprising instructions executable by said processor and configured for:
      creating a job having at least one page in association with a plurality of programming attributes to be monitored and controlled via a document creation application;
      performing raster image processing with respect to said job associated with said plurality of programming attributes in order to thereafter store said job in an electronic storage component as a custom sample job;
      selecting said custom sample job with respect to a primary rendering job in order to render said custom sample job based on a predefined frequency interval to a sample tray and thereby monitor print quality and increasing proofing flexibility during a production run; and
      pre-defining said frequency interval associated with said custom sample job.

16. The system of claim 15 wherein said instructions are further configured for programming said custom sample job with similar job settings with respect to said primary rendering job based on a user preference.

17. The system of claim 15 wherein said instructions are further configured for programming said custom sample job with dissimilar job settings with respect to said primary rendering job based on a user preference.

18. The system of claim 15 wherein said instructions are further configured for submitting said custom sample job based on said predefined frequency each time an appropriate number of document set associated with said primary rendering job is rendered for a main production run.

19. The system of claim 15 wherein said instructions are further configured for designating said plurality of programming attributes to comprise at least one of the following types of attributes:
- stress images;
- color sweep test patches;
- image areas;
- text and graphics; and
- spot colors.

20. The system of claim 16 wherein said instructions are further configured for:
- programming said custom sample job with similar job settings with respect to said primary rendering job based on a user preference;
- programming said custom sample job with dissimilar job settings with respect to said primary rendering job based on a user preference; and
- submitting said custom sample job based on said predefined frequency each time an appropriate number of document set associated with said primary rendering job is rendered for a main production run, by executing a program instruction in a data-processing system.

* * * * *